(12) United States Patent
Bedjaoui et al.

(10) Patent No.: US 8,962,080 B2
(45) Date of Patent: Feb. 24, 2015

(54) METHOD FOR PATTERNING A POLYMER LAYER AND METHOD FOR PACKAGING A MICROBATTERY

(75) Inventors: Messaoud Bedjaoui, Echirolles (FR); Sylvain Poulet, Victor de Cessieu (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 549 days.

(21) Appl. No.: 13/227,812

(22) Filed: Sep. 8, 2011

(65) Prior Publication Data

US 2012/0070588 A1 Mar. 22, 2012

(30) Foreign Application Priority Data

Sep. 20, 2010 (FR) ...................... 10 03726

(51) Int. Cl.
| | | |
|---|---|---|
| *H01M 10/04* | (2006.01) | |
| *H01M 2/02* | (2006.01) | |
| *H01M 6/18* | (2006.01) | |
| *H01M 6/40* | (2006.01) | |
| *H01M 10/052* | (2010.01) | |
| *H01M 10/0562* | (2010.01) | |
| *H01M 10/0585* | (2010.01) | |
| *H01M 4/04* | (2006.01) | |
| *H01M 4/1391* | (2010.01) | |
| *H01M 4/1395* | (2010.01) | |
| *H01M 4/1397* | (2010.01) | |
| *H01M 4/485* | (2010.01) | |
| *H01M 4/58* | (2010.01) | |

(52) U.S. Cl.
CPC .......... *H01M 10/0436* (2013.01); *H01M 2/021* (2013.01); *H01M 2/0275* (2013.01); *H01M 2/0277* (2013.01); *H01M 6/187* (2013.01); *H01M 6/188* (2013.01); *H01M 6/40* (2013.01); *H01M 10/052* (2013.01); *H01M 10/0562* (2013.01); *H01M 10/0585* (2013.01); *H01M 2/0287* (2013.01); *H01M 2/0292* (2013.01); *H01M 4/0426* (2013.01); *H01M 4/0428* (2013.01); *H01M 4/1391* (2013.01); *H01M 4/1395* (2013.01); *H01M 4/1397* (2013.01); *H01M 4/485* (2013.01); *H01M 4/5815* (2013.01); *H01M 2300/0068* (2013.01); *H01M 2300/0094* (2013.01); *Y02E 60/122* (2013.01)
USPC ......... 427/259; 427/508; 427/385.5; 427/386

(58) Field of Classification Search
CPC ................................ H01M 2/021; H01M 6/40
USPC .............. 427/58, 299; 429/185, 162; 430/299
See application file for complete search history.

(56) References Cited

U.S. PATENT DOCUMENTS

| 4,634,495 | A | * | 1/1987 | Gobrecht et al. ............. 438/700 |
|---|---|---|---|---|
| 5,672,463 | A | * | 9/1997 | Hozumi et al. ............ 430/281.1 |
| 2005/0147877 | A1 | * | 7/2005 | Tarnowski et al. ............ 429/162 |
| 2008/0032236 | A1 | * | 2/2008 | Wallace et al. ............... 430/319 |

FOREIGN PATENT DOCUMENTS

| EP | 2 166 609 A1 | 3/2010 |
|---|---|---|
| WO | WO 2008/011061 A1 | 1/2008 |

* cited by examiner

*Primary Examiner* — Alex A Rolland
(74) *Attorney, Agent, or Firm* — Oliff PLC

(57) ABSTRACT

The method for patterning a polymer layer arranged on a support comprises deposition of a layer made from a lithium-based polymerization inhibitor material on a first area of the support, deposition of a cationically polymerizable material on the polymerization inhibitor layer and on a second area of the support, application of polymerization treatment resulting in a non-solidified sacrificial layer in the first area and the polymer layer in the second area, and elimination of the sacrificial layer.

9 Claims, 4 Drawing Sheets

METHOD FOR PATTERNING A POLYMER LAYER AND METHOD FOR PACKAGING A MICROBATTERY

BACKGROUND OF THE INVENTION

The invention relates to a method for patterning a polymer layer on a support, and more particularly to a method for packaging a microbattery by means of a polymer layer and a barrier layer.

STATE OF THE ART

Lithium microbatteries are generally formed by two electrodes (positive and negative) separated by an electrolyte. They further comprise metal current collectors made from platinum or tungsten. The positive electrode is made from a material having a good ionic conductivity, for example titanium oxysulfide (TiOS). The electrolyte is an electric insulator having a high ionic conductivity such as lithium phosphorus oxynitride (LiPON). The negative electrode is made from metal lithium or a lithiated material.

As materials containing lithium are extremely sensitive to air, in particular to oxygen and moisture, they have to be covered by an inert and tight protective barrier. Mastering packaging is a primordial factor which conditions the efficiency of microbatteries with time.

One packaging solution consists in depositing thin layers on the microbattery. The packaging device then comprises a first layer of polymer material arranged on the microbattery and a second layer of ceramic or metallic material covering the first layer. The object of the polymer layer is on the one hand to limit the defects related to the roughness of the substrate, and on the other hand to accommodate deformations of the microbattery during use of the microbattery. The layer of ceramic or metallic material forms a protective barrier against oxygen and moisture.

The polymer layer is generally spin-coated over the whole of the substrate whereas the barrier layer is formed by physical vapor deposition (PVD) or plasma-enhanced chemical vapor deposition (PECVD).

Two techniques are mainly used to pattern the packaging device. The first technique uses a mask to define the patterns. However, shadow and misalignment effects occur and give rise to imprecision as to the position or size of the pattern to be produced. These shadow and misalignment effects become preponderant for microbatteries of small dimensions. The tendency is then to no longer use masks and rather to use the second technique, which is photolithography.

FIG. 1 schematically represents a photolithography operation to delineate a packaging device of a microbattery 2 arranged on a support 4. The packaging device comprises a polymer layer 6 and a barrier layer 8 previously deposited on the whole of microbattery 2 and of support 4. An etching mask 10 made from photoresist is formed on the packaging device, and layers 6 and 8 are then etched through mask 10. This photolithography operation further enables the electric connections of the microbattery to be established, partially releasing current collectors 12 located at the ends of microbattery 2.

This patterning technique does not guarantee lateral protection of the microbattery. Barrier layer 8 does not in fact cover polymer layer 6 on the flanks of microbattery (etching flanks), as shown in FIG. 1. On account of the low level of protection of the polymer layer, oxygen and water are liable to diffuse through layer 6 and damage microbattery 2.

Although damage of the microbattery takes place mainly at the top surface for components of large dimensions, lateral protection of the microbattery becomes primordial for components of small size. For the purposes of miniaturization, it is therefore necessary to cover the whole of the microbattery with the barrier layer to increase its lifetime.

Photolithography uses an etching solution to etch packaging layers 6, 8 and a cleaning solution to eliminate etching mask 10. These solutions are also liable to penetrate into microbattery 2 and damage it. An over-etching of layers 6 and 8 also exists which further reduces the lateral protection of the component. Finally, photolithography comprises a large number of steps which significantly increase the duration of microbattery fabrication methods. The polymer material layers being deposited easily on the whole of the substrate, generally by spin-coating, it is required a method to pattern these layers that is just as simple, in particular in the case of a layer packaging a microbattery.

SUMMARY OF THE INVENTION

A need therefore exists to provide a simple and fast method for patterning a layer of polymer material on a support.

This need tends to be satisfied by depositing a layer of a lithium-based polymerization inhibitor material on a first area of the support, depositing a cationically polymerizable material on the polymerization inhibitor layer and on a second area of the support, subjecting the cationically polymerizable material to polymerization treatment resulting in a layer of non-solidified sacrificial layer in the first area and the polymer layer in the second area, and eliminating the sacrificial layer.

It is also provided a fast and easy-to-implement method to package a lithium microbattery arranged on a support, ensuring lateral protection of the microbattery.

The packaging method comprises deposition of a layer of lithium-based polymerization inhibitor material on the support at the periphery of the microbattery, deposition of a cationically polymerizable material on the whole of the microbattery and on the polymerization inhibitor layer, polymerization treatment applied to the cationically polymerizable material, resulting in a sacrificial layer at the periphery of the microbattery and a polymer layer covering the microbattery, deposition of a layer forming a protective barrier on the polymer layer and covering the whole of the microbattery, and elimination of the sacrificial layer and the polymerization inhibitor layer.

BRIEF DESCRIPTION OF THE DRAWINGS

Other advantages and features will become more clearly apparent from the following description of particular embodiments given for non-restrictive example purposes only and illustrated by means of the appended drawings, in which.

DESCRIPTION OF A PREFERRED EMBODIMENT OF THE INVENTION

Chain polymerization designates the chemical reaction between reactive molecules, generally linear monomers or prepolymers, which bond together in covalent manner. This chain reaction is initiated by means of initiators. The initiators, due to the action of heat or of ultraviolet radiation, release active centers on which the monomers bond. Two main polymerization mechanisms exist, radical or cationic, depending on the nature of these active centers.

In a radical polymerization, the active center is a radical, i.e. a chemical species having one or more non-paired electrons. Dibenzoyl and azobisisobutyronitrile (AIBN) are commonly used as initiators. The monomers concerned by this type of polymerization are for example acrylates or methacrylates.

It is well known that radical polymerization is inhibited by the oxygen in the air. Air fixes on the free radicals and forms peroxide radicals which are inactive. It is however possible to perform radical polymerization in the presence of oxygen by using sensitizers or by increasing the intensity of the radiation.

Cationic polymerization involves a free ion, or possibly a pair of ions, as active center. The initiators are generally protonic acids such as sulfuric acid or triflic acid. Unlike radical polymerization, cationic polymerization is insensitive to oxygen.

It has on the other hand been discovered by the inventors that cationic polymerization is inhibited in the presence of lithium. A material containing lithium in fact presents the ability to trap the ions (active centers) that are vectors of the polymerization reaction. Such a material will henceforth be called polymerization inhibitor.

It is proposed to use this phenomenon to localize cationic polymerization, by depositing a layer of polymerization inhibitor material prior to deposition of a polymerizable material.

Figure 1:
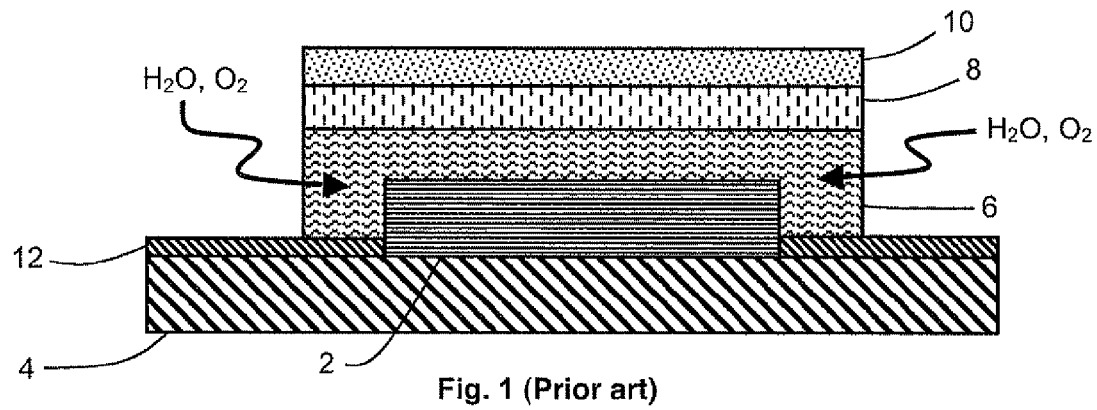
FIG. 1 represents patterning of packaging layers of a microbattery by photolithography according to the prior art.
Figure 2:
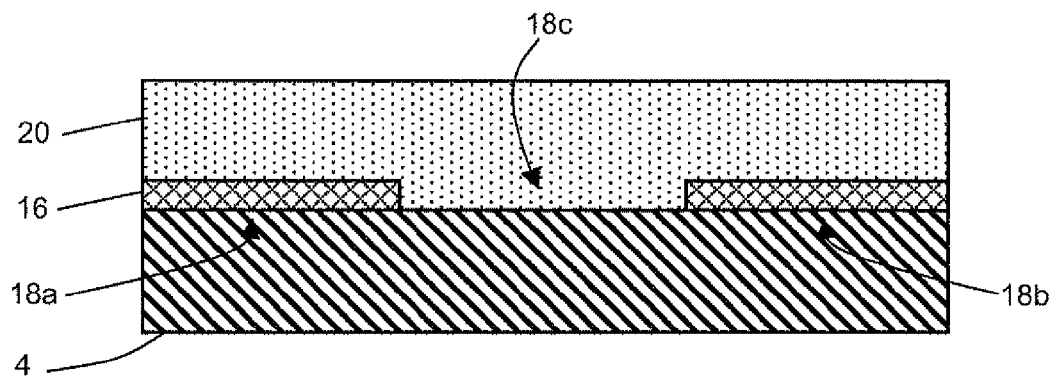
FIGS. 2 to 4 represent steps of a patterning method of a polymer layer according to an embodiment of the invention.
Figure 3:
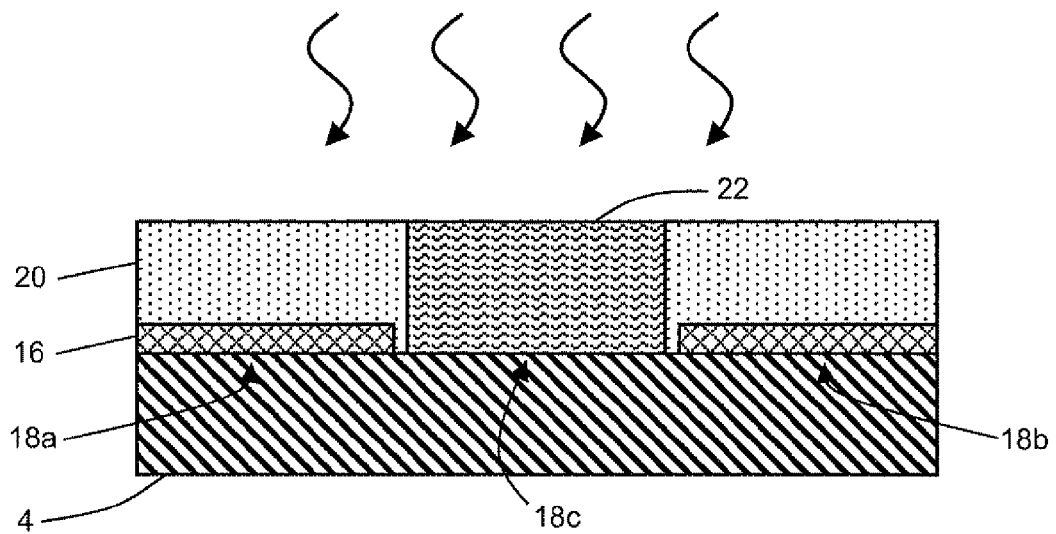
Figure 4:
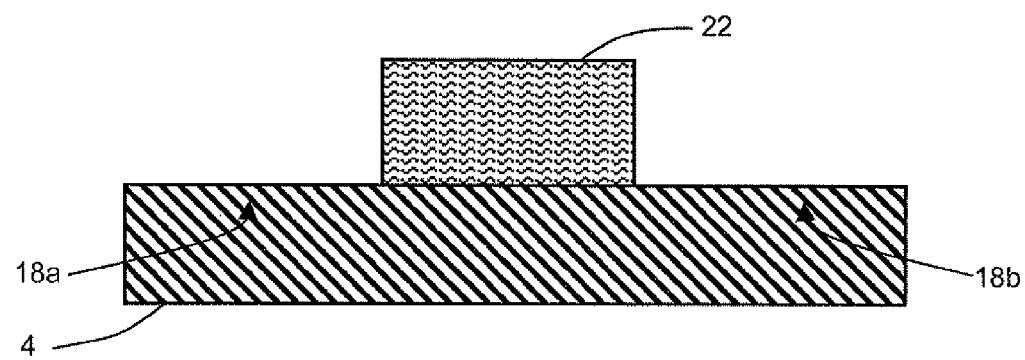

FIGS. 2 to 4 schematically represent steps of an embodiment of a polymer layer patterning method, by means of a lithium-based material.

FIG. 2 represents deposition of a layer 16 made from lithium-based inhibitor material on a support 4 of any kind. Layer 16 of inhibitor material is for example deposited in two distinct areas 18a and 18b of the support. The inhibitor material is preferably lithium in metal form, lithium phosphorus oxynitride (LiPON), lithiated titanium oxysulfide (LiTiOS), lithiated titanium disulfide ($LiTiS_2$) or lithiated vanadium pentoxide ($LiV_2O_5$). The metal lithium is for example deposited by vacuum evaporation and LiPON can be deposited by PVD. The thickness of layer 16 preferably varies between 50 nm and 3 µm.

A layer 20 of polymerizable material is then deposited on layer 16, and also in an area 18c of support 4 comprised between areas 18a and 18b. This deposition is preferably performed by spin-coating, on full sheet, i.e. on the whole of the top surface of support 4. The thickness of layer 20 then varies between 1 and 5 µm depending on the speed of rotation. Other deposition methods can be used such as screen printing, microdispersion or aspersion. The thickness of layer 20 is generally also comprised between 1 and 5 µm.

What is meant by polymerizable material is a solution comprising monomers (or prepolymers) and at least one initiator of cationic type. Monomers with a vinyl ether base or heterocyclic monomers (epoxides, lactones, cyclic ethers, epoxysilicones . . . ) can be used. As epoxide monomers and vinyl ethers are particularly reactive, they will be privileged so as to obtain fast polymerization.

Certain products available on the market, commonly called photopolymerizable or thermosetting resins, comprise these monomers, in particular the "OG" products (OG146-178, UVO-114, OG115, OG114-4, OG146 . . . ) and the "Epo-Tek" products (Epo-Tek-301, Epo-Tek-354, Epo-Tek-305, Epo-Tek-H705 . . . ) marketed by Epoxy Technology.

The initiator is preferably chosen from protonic acids ($H_2SO_4$, $CF_3SO_3H$ . . . ), inorganic halogenides ($BF_3$, $SnCl_2$ . . . ), organometallic compounds ($Al(CH_3)_3$, Salen complex . . . ) and organic salts ($R_3O^+$). The initiator is generally comprised in the above-mentioned resins.

In FIG. 3, material 20 is subjected to polymerization treatment so that the initiator of the material creates ions to initiate the chain reaction. Material 20 is preferably subjected to heat treatment (the case of thermo-initiators) or exposed to radiation (the case of photo-initiators). For example purposes, layer 20 is exposed to ultraviolet radiation of a wavelength comprised between 300 and 600 nm, for a duration of less than 10 min, with a power density of about 100 mW/cm$^2$.

In areas 18a and 18b, the ions of layer 20, responsible for triggering the cross-linking chain, react for the most part with the atoms of lithium-based material 16 and cannot initiate the polymerization reaction. Layer 20 in areas 18a and 18b is therefore left intact or weakly polymerized. On the other hand, in area 18c devoid of material 16, the polymerization reaction takes place normally. A pattern 22 of polymer material is then obtained on completion of the treatment.

In other words, a layer with parts of different natures is obtained in this step: a non-polymerized or weakly-polymerized part above layer 16, and a polymerized part elsewhere. The non-polymerized part in contact with material 16 is soluble in a developer solution whereas the polymerized part is insoluble in it.

The non-polymerized part can extend up to about 5 µm in the height direction (i.e. for a thickness of layer 20 of 5 µm or less) and up to 1 µm laterally (generally between 0.2 and 1 µm on each side of layer 16).

The step of FIG. 4 consists in eliminating the polymerizable material left intact in areas 18a and 18b. This elimination step is preferably performed using water, a solvent or several solvents such as acetone or ethanol. Layer 16 of inhibitor material can be eliminated simultaneously so as to only leave the desired pattern 22 on support 4.

This method therefore enables a layer of polymer material to be delineated in simple manner. This method is precise, quick and easy to implement, unlike techniques of the prior art. It is particularly suitable for the microelectronics industry, in particular for packaging microbatteries using a polymer layer.

FIGS. 5 to 10 represent steps of an embodiment of a lithium microbattery packaging method. This preferred embodiment comprises formation of the microbattery. To delineate the different layers constituting the microbattery, masks can be used. The patterning method described above enables the packaging device arranged on the microbattery to be delineated.

Figure 5:
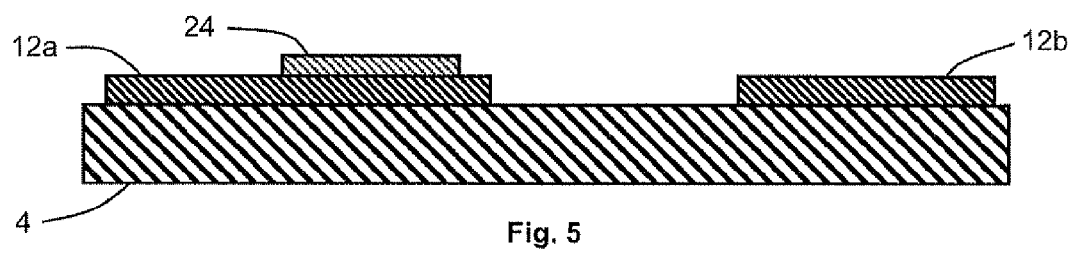
FIGS. 5 to 10 represent steps of a packaging method of a microbattery using the method of FIGS. 2 to 4.

FIG. 5 represents an initial substrate 4 comprising cathodic 12a and anodic 12b current collectors, for example made from titanium, tungsten or gold. These metal current collectors are deposited in the form of thin layers (about 200 nm), for example by PVD.

A cathode 24 is then deposited on cathodic collector 12a, for example by vacuum evaporation or cathodic sputtering. The cathode is comprised of a layer of lithium insertion material such as titanium oxysulfide TiOS, vanadium pentoxide $V_2O_5$ or titanium disulfide $TiS_2$. It has a thickness of about 1.5 µm.

Figure 6:
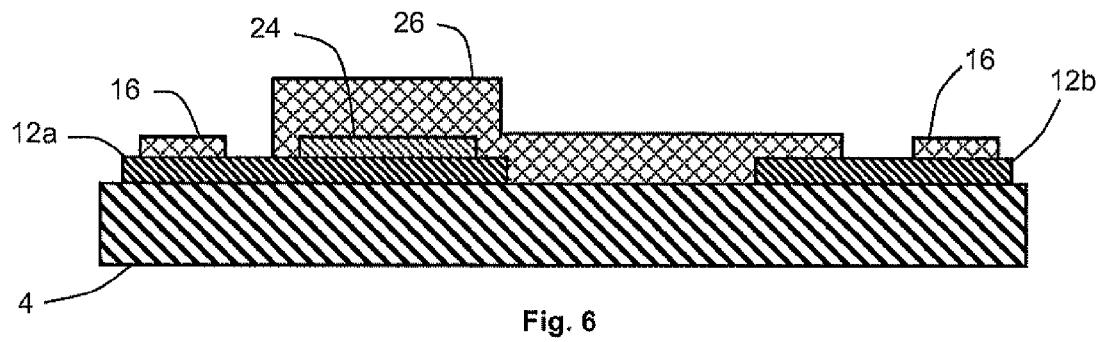

In FIG. 6, an electrolyte layer 26, preferably a LiPON-based electrolyte, is deposited on cathode 24, on a part of anodic collector 12b and on the area of the substrate separating collectors 12a and 12b. Layer 26 preferably completely covers cathode 24. Deposition is for example performed by cathodic sputtering so as to obtain a defect-free LiPON layer with a thickness of about 1.5 μm.

A pattern of polymerization inhibitor material 16 is formed at the periphery of the microbattery. Inhibitor material 16 is preferably deposited on substrate 4 around electrolyte layer 26 so as to form a closed peripheral pattern, distinct from layer 26. Pattern 16 preferably covers a part of collectors 12a and 12b, as represented in the cross-sectional view of FIG. 6. In this embodiment, pattern 16 is made from LiPON, like electrolyte 26, and deposition of pattern 16 is performed at the same time as deposition of layer 26 using a single mask.

Figure 7:
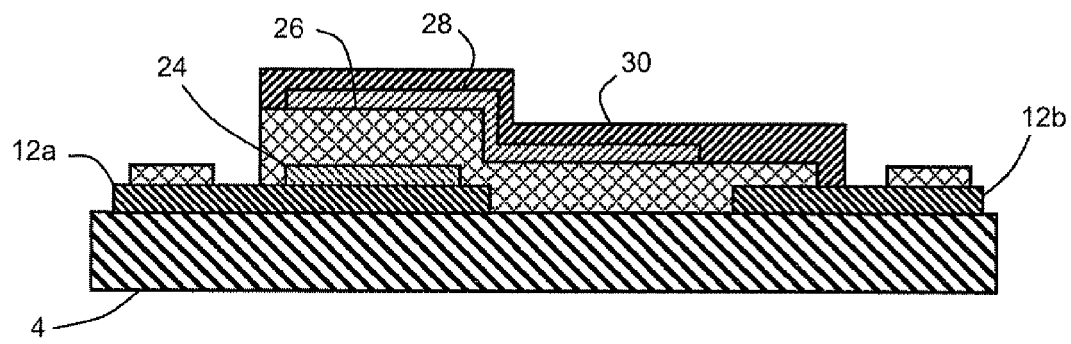

The step of FIG. 7 corresponds to formation of anode 28 on layer 26. Anode 28 is preferably made from metal lithium and is deposited by vacuum evaporation. Its thickness varies between 1 μm and 3 μm. A metal layer 30, for example made from titanium, gold, aluminum or copper, is then deposited on the top surface of anode 28 and on a part of collector 12b. Layer 30 thus makes the electric connection between anode 28 and anodic collector 12b. This metal layer enables the surface roughness of lithium layer 28 to be reduced. The anodic current conduction is moreover improved compared with a lithium layer 28 extending up to collector 12b.

Figure 8:
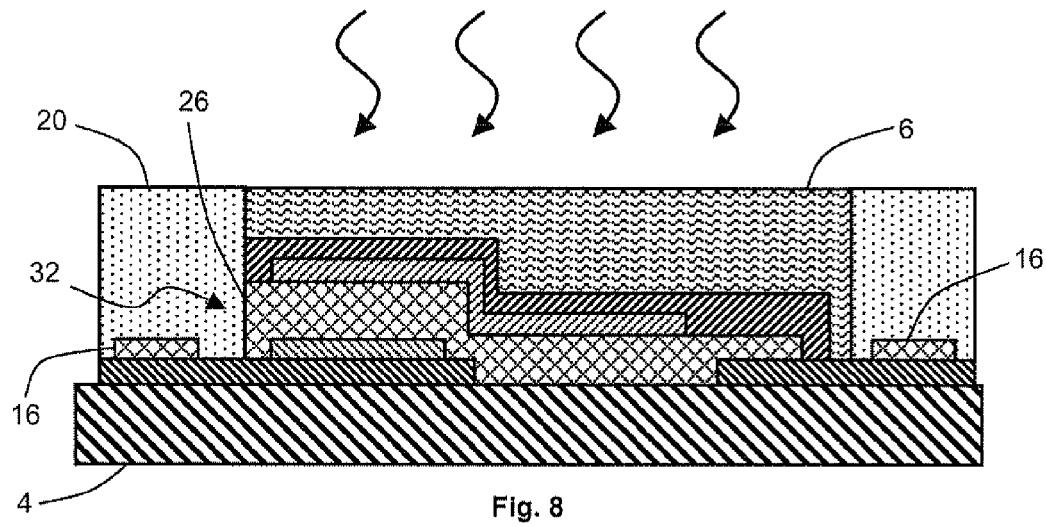
Figure 9:
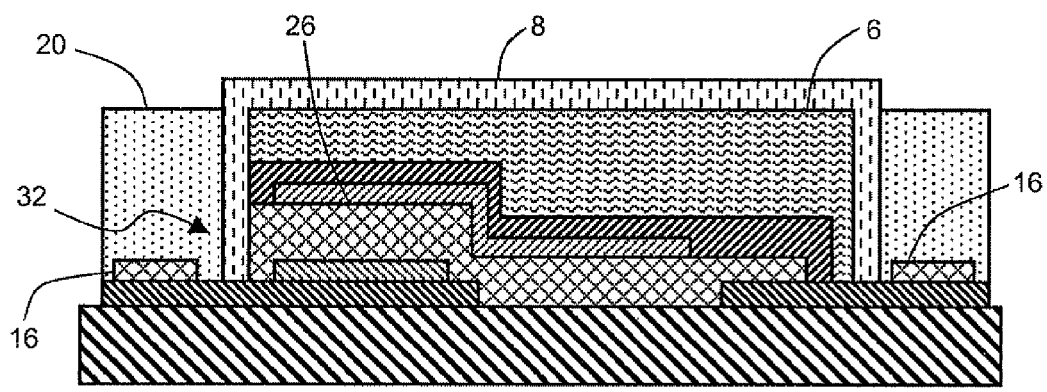
Figure 10:
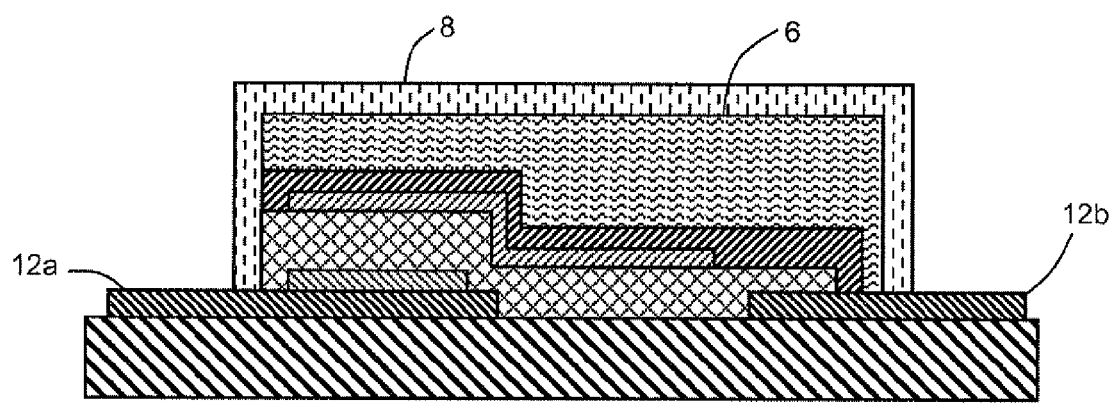

FIGS. 8 to 10 represent fabrication steps of the microbattery packaging device. The packaging device comprises a layer 6 of polymer type arranged on the microbattery and a protective layer 8, or barrier layer, arranged on the polymer layer.

As described in the foregoing, the polymer layer limits the defects related to the roughness of the substrate to enhance the protective effect of the barrier layer. It also enables deformations of the microbattery on charging and discharging to be absorbed. For this, the use of an insulating polymer having a high mechanical flexibility is preferred. A polymer that is easy to implement and that enables the microbattery relief to be flattened is further desirable. It is also preferable for the polymer to be thermally stable. The microbattery (and its packaging device) can in fact be subjected to heat treatments at temperatures of about 260° C. during integration of the microbattery in external devices.

Epoxide-based materials meet these requirements of microbattery technology, in particular the products marketed by Epoxy Technology mentioned in the above.

FIG. 8 represents the formation step of polymer layer 6 on the microbattery from a layer 20 of polymerizable material, as described in relation with FIG. 3.

Layer 20 is deposited, preferably on full sheet, by spin-coating. Material 20 then covers substrate 4, collectors 12a and 12b, pattern 16 and the microbattery.

By subjecting material 20 to polymerization treatment, the material solidifies to form a polymer material, except in the area of pattern 16 made from inhibitor material, at the periphery of the microbattery. The required polymer layer 6, which covers a large part of the microbattery, is then obtained, surrounded by non-polymerized material 20.

In the example of FIG. 8, a lateral area 32 of the microbattery is not covered by layer 6 because material 20 is in direct contact with electrolyte layer 26 in this area. LiPON layer 26 in fact prevents polymerization of material 20 in the same way as pattern 16. However, this area 32 not covered by polymer 6 has no incidence on protection of the microbattery. The tightness of the microbattery with respect to chemical species is ensured by a subsequently formed barrier layer 8 which covers the whole of microbattery.

FIG. 9 represents deposition of barrier layer 8 on polymer layer 6 and on the areas of the microbattery not covered by the polymer.

The material of layer 8 is preferably chosen from silicon oxide, silicon nitride, silicon oxynitride and alumina. Barrier layer 8 is preferably deposited conformally by PVD, CVD or ALD (Atomic Layer Deposition). Its thickness is comprised between 50 nm and 300 nm.

In this step, material 8 is deposited along a profile, also called frame, defined by the layers of materials in solid phase. In the example of FIG. 9, this frame is composed of polymer layer 6 and of electrolyte layer 26 in area 32. The non-polymerized material 20 is not part of the frame.

In other words, the material of layer 8 is deposited on the top surface of layer 6 and is inserted at the level of the flanks of the microbattery between solid layer 6 and liquid material 20 or between solid layer 26 and liquid material 20.

Thus, by previously delineating polymer layer 6 by means of an inhibitor material, barrier layer 8 is deposited both on the flanks and on the top surface of the microbattery. Packaging of the microbattery is therefore total.

In FIG. 10, the material that has not polymerized and the inhibitor material are eliminated by means of a developer. Elimination of LiPON layer 16 and of remaining material 20 can for example be performed by means of a phosphoric acid solution ($H_3PO_4$), followed by rinsing with water.

As barrier layer 8 covers the whole of microbattery, the development and rinsing solutions are not liable to infiltrate into the microbattery and damage it. Electric connection of the microbattery on the front surface of the substrate is further facilitated. As the inhibitor material was deposited partly on metal collectors 12a and 12b, the collectors are in fact released when development is performed.

The microbattery packaging method described in relation with FIGS. 5 to 10 advantageously comprises deposition of the lithium-based inhibitor material 16 during formation of the microbattery. Material 16 and electrolyte 26 are in fact both made from LiPON and are deposited simultaneously. However, it is also possible to perform deposition of the inhibitor material at the same time as deposition of the anode with metal lithium, or as deposition of the cathode with $LiTiOS$, $LiTiS_2$ and $LiV_2O_5$.

In an alternative embodiment, deposition of the inhibitor material is performed after the microbattery has been formed on the substrate. This deposition then constitutes an additional step compared with the preferred embodiment described in the foregoing. This alternative embodiment is used for example when the electrolyte is made from a material other than LiPON, when the anode is made from a material other than metal lithium or when the cathode is made from a material other than $LiTiOS$, $LiTiS_2$ and $LiV_2O_5$.

The packaging method is quick and easy to implement. It in fact comprises a reduced number of steps compared with a conventional photolithography operation and these steps are compatible with microelectronics technologies.

The invention claimed is:

1. A method for patterning a polymer layer arranged on a support comprising the following steps:
   depositing a layer made from a lithium-based polymerization inhibitor material on a first area of the support, a second area of the support being devoid of the lithium-based polymerization inhibitor material,
   depositing a layer of cationically polymerizable material on the polymerization inhibitor layer and on the second area of the support,
   subjecting the cationically polymerizable material covering the first area and the second area to polymerization treatment resulting in:
   the formation of a polymer layer in the second area devoid of a lithium-based polymerization inhibitor material, the pattern of the second area defining the pattern of the polymer layer, and a non-solidified sacrificial layer in the first area, and eliminating the non-solidified sacrificial layer.

2. The method according to claim 1, wherein the polymerization inhibitor material is at least one selected from the group consisting of metal lithium, lithium phosphorus oxynitride, lithiated titanium oxysulfide, lithiated titanium disulfide and lithiated vanadium pentoxide.

3. The method according to claim 1, comprising elimination of the polymerization inhibitor material simultaneously with elimination of the non-solidified sacrificial layer.

4. The method according to claim 1, wherein the cationically polymerizable material is polymerized by ultraviolet irradiation or by heat treatment.

5. The method according to claim 1, wherein the cationically polymerizable material comprises epoxide or vinyl ether monomers and a protonic acid-based initiator.

6. A method for packaging a lithium microbattery arranged on a support, comprising the following steps:

depositing a layer made from a lithium-based polymerization inhibitor on the support at the periphery of the microbattery, a remaining area of the microbattery having a top surface devoid of the lithium-based polymerization inhibitor, depositing a cationically polymerizable material on the whole of the microbattery and on the polymerization inhibitor layer, subjecting the cationically polymerizable material to polymerization treatment resulting in a non-solidified sacrificial layer at the periphery of the microbattery and a polymer layer covering the remaining area of the microbattery, depositing a layer forming a protective barrier on the polymer layer covering the whole of the microbattery, and eliminating the non-solidified sacrificial layer and the polymerization inhibitor layer.

7. The method according to claim 6, wherein the polymerization inhibitor material is at least one selected from the group consisting of metal lithium, lithium phosphorus oxynitride, lithiated titanium oxysulfide, lithiated titanium disulfide and lithiated vanadium pentoxide.

8. The method according to claim 6, wherein, in the microbattery comprising an electrode made from metal lithium, lithiated titanium oxysulfide, lithiated titanium disulfide or lithiated vanadium pentoxide, deposition of the polymerization inhibitor layer and deposition of the electrode are performed simultaneously.

9. The method according to claim 6, wherein, in the microbattery comprising an electrolyte made from lithium phosphorus oxynitride, deposition of the polymerization inhibitor layer and deposition of the electrolyte are performed simultaneously.

* * * * *